(12) United States Patent
Li et al.

(10) Patent No.: US 7,758,689 B2
(45) Date of Patent: Jul. 20, 2010

(54) NANO-TALC WITH HYDROPHOBIC COATING

(75) Inventors: Mei Li, Mars, PA (US); Qiping Zhong, Cupertino, CA (US); Srikanth Raghunathan, Irwin, PA (US)

(73) Assignee: NGX, Inc., Pittsburgh, PA (US)

( * ) Notice: Subject to any disclaimer, the term of this patent is extended or adjusted under 35 U.S.C. 154(b) by 1469 days.

(21) Appl. No.: 10/920,747

(22) Filed: Aug. 18, 2004

(65) Prior Publication Data

US 2006/0040102 A1 Feb. 23, 2006

(51) Int. Cl.
*C09C 1/02* (2006.01)
(52) U.S. Cl. .................. 106/469; 106/471; 428/402; 428/403
(58) Field of Classification Search .......... 106/469, 106/471; 428/402, 397, 403; 162/164.6, 162/168.2, 168.3, 181.1, 181.2, 181.7
See application file for complete search history.

(56) References Cited

U.S. PATENT DOCUMENTS

| | | | | |
|---|---|---|---|---|
| 3,333,776 A | * | 8/1967 | Rauner et al. | 241/22 |
| 6,156,327 A | * | 12/2000 | Sekutowski et al. | 424/405 |
| 2003/0143144 A1 | * | 7/2003 | Sharma et al. | 423/268 |
| 2004/0241442 A1 | * | 12/2004 | He et al. | 428/397 |

* cited by examiner

*Primary Examiner*—Jerry Lorengo
(74) *Attorney, Agent, or Firm*—Debra M. Parrish, P.C.

(57) ABSTRACT

In one embodiment the invention is a hydrophobic nano-talc composition that is the reaction product of nano-talc with an ammonium, pyridinium or phosponium salt. The composition is characterized by a carbon content of about 5 to about 25 wt %. The compositions are useful in preparing nano-talc/polymer composites. In another embodiment, the invention is a process for preparing a nano-talc composition of the invention.

17 Claims, 6 Drawing Sheets

NANO-TALC WITH HYDROPHOBIC COATING

BACKGROUND OF INVENTION

1. Field of Invention

The invention relates to methods for the surface modification of hydrophilic nano-talc slurries and the formation of hydrophobic nano-talc powders for polymer composites.

2. Description of Related Art

Talc is a naturally occurring mineral, a layered hydrous magnesium silicate of general empirical formula $Mg_3Si_4O_{10}(OH)_2$, that is broken up and usually ground to a fine powder. Talc is a white, apple green, gray powder with luster pearly or greasy with a Mohs hardness of 1-1.5. It has a high resistance to acids, alkalies and heat. The hydroxy groups normally are internal to the magnesium layer and are not accessible to water except at the edges of the silicate sheet. Thus, conventional talc powder is a hydrophobic material that easily blends and disperses with organic media including polymers but is not easily dispersed in aqueous media.

Earlier U.S. patent applications Ser. No. 10/890,852, filed Jul. 14, 2004 and 10/175,976, filed Jun. 20, 2002, commonly owned by same assignee as the application described herein, describe methods of providing an aqueous nano-talc slurry with a specific surface area of 70 $m^2/g$ to about 500 $m^2/g$. The nano-talc powders provided by these methods show unusual properties for talc, in that the powders exhibit a hydrophilic rather than hydrophobic character. For instance, one such hydrophilic nano-talc composition, derived from the so-called hybrid milling process, is characterized by absorbing about 5 to about 15 wt % water at about 40% to about 60% relative humidity. Slurries of the same hydrophilic nano-talc remain suspended in water for months with very little sedimentation. Although these properties are of interest for aqueous based composite systems, the hydrophilic properties of the nano-talc powders is a disadvantage, when attempting to blend the nano-talc in organic polymers or other hydrophobic media. The inventors have found that surface modification of the nano-talc slurries with amphophilic cations effectively changes the nano-talc properties from hydrophilic to a hydrophobic character. Thus, the invention provides a hydrophobic nano-talc composition that is useful in preparing hydrophobic polymer composites.

SUMMARY OF INVENTION

In one embodiment the invention provides a hydrophobic nano-talc composition comprising the aqueous reaction product derived from reaction of a plurality of nano-talc particles having a specific surface area of about 70 to 500 $m^2/g$, a number average particle size of 50 to about 200 nm and an isoelectric point of about 2.5 to about 3.5; and an alkylammonium salt, alkylpyridinium salt, or alkylphosphonium salt, wherein the alkyl group is selected from the group $C_{12}$-$C_{22}$ straight-chain or branched-chain alkyl group interrupted or uninterrupted by one or two oxygen atoms.

In another embodiment the invention is a method of providing a hydrophobic nano-talc composition comprising: combining (a) an aqueous solution comprising about 0.5 to 10 wt % of an alkylammonium salt, alkylpyridinium salt or alkylphosponium salt wherein the alkyl group is selected from the group $C_{12}$-$C_{22}$ straight-chain or branched-chain alkyl group interrupted or uninterrupted by one or two oxygen atoms; with (b) an aqueous nano-talc slurry comprising a plurality of nano-talc particles having a specific surface area of about 70 to 500 $m^2/g$, a number average particle size of 50 to about 200 nm and an isoelectric point of about 2.5 to about 3.5; with mixing at a reaction temperature sufficient to maintain the alkylammonium salt, alkylpyridinium salt or alkylphosphonium salt in solution, to provide a hydrophobic nano-talc precipitate, washing sufficiently the hydrophobic nano-talc precipitate with wash water, to provide a wash water effluent with a measured conductivity below about 400 µs/cm, followed by, optionally, dewatering the hydrophobic nano-talc precipitate to provide a hydrophobic nano-talc cake, and drying the hydrophobic nano-talc precipitate or hydrophobic nano-talc cake to provide the hydrophobic nano-talc composition.

DETAILED DESCRIPTION OF INVENTION

Figure 1:
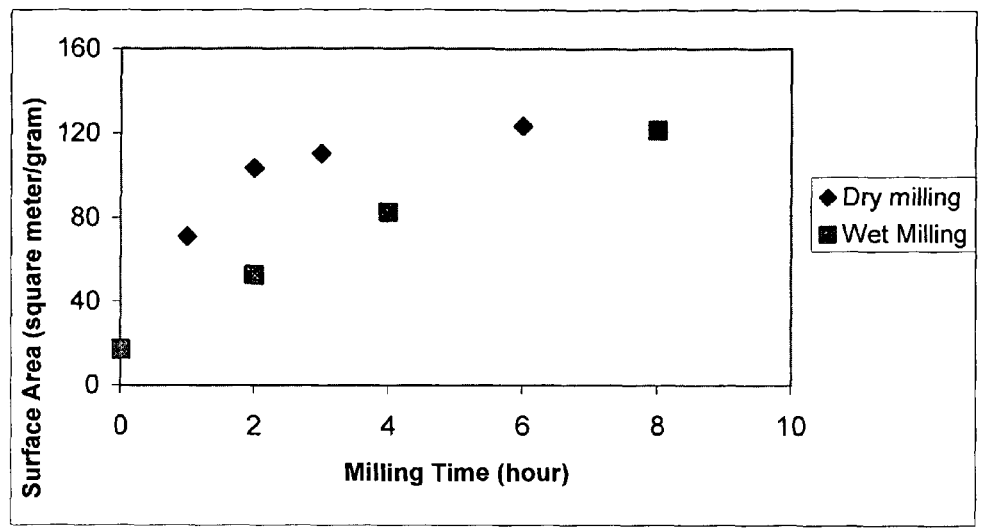
FIG. 1 illustrates the surface area of talc as a function of milling time for conventional one step process of dry milling or wet milling that acts as a control.

Nano-talc slurries useful in the invention are derived from novel milling methods referred to as the hybrid milling process and soaking process described in U.S. patent application Ser. No. 10/890,852 filed Jul. 14, 2004, and the salt milling process, also referred to as matrix separation process described in application Ser. No. 10/175976, filed Jun. 20, 2002, both commonly owned by the assignee of the application described herein. The milling methods and resulting nano-talc slurries provided will be first described.

The talc powder used in the novel milling processes may be any commercial talc derived from natural sources. The talc initial particle size is not of great importance, but preferably the initial median particle size is about 0.5 µm to about 10 µm and the talc has a specific surface area (SSA) of about 5 $m^2/g$ to about 20 $m^2/g$. Commercial samples of such a talc powder are the Luzenac America's NICRON® 674 (SSA 14 $m^2/g$), CIMPACT® 710 (SSA 14 $m^2/g$) and Specialty Minerals Inc. UltraTalc™ 609 (SSA 17 $m^2/g$).

Throughout the specification reference is made to the specific surface area (SSA) of the talc slurry. The SSA number corresponds to that derived from the BET surface area measurement that is described in J. Am. Chem. Soc., 60, 309 (1938) by Brunauer, Emmett and Teller. There are well known commercial instruments available that are used to measure the SSA using nitrogen as the gas absorbed. The SSA is used to monitor the progress of the milling processes for the talc powder.

Mechanical milling may be accomplished with any mill that provides high intensity, high energy pounding or grinding such as a vibratory mill, planetary mill, uniball mill or high energy ball mill. Alternative equipment e.g. hammer mill, sand milling, jet mill (steam or air), air classified mill (ACM) plus combination of milling and classification equipment may be used to provide a talc powder with a SSA of about 40 m$^2$/g to about 130 m$^2$/g. Preferred mills for the process are Attritor mills that have a plurality of small solid balls as the grinding media, about 0.2 mm to about 10 mm in diameter, and preferably about 3 mm to about 6 mm. The media may be steel or ceramic balls. Preferably the media is selected from the group of carbon steel, stainless steel, tungsten carbide, ceria stabilized zirconia oxide, zirconia silicate, alumina and yttria-stabilized zirconia balls. The ball to powder ratio and the speed of the mill are two important parameters that determine the energy delivered to the powder in the milling process. Preferably about a 10:1 to about 30:1 weight ratio of ball to powder is used and most preferably about a 20:1 ratio is used. The mill is generally run at about 100 to about 500 rpms.

The nano-talc slurries used in the invention require in the first step a mechanical milling of the talc powder in the dry state, that is, without liquid vehicles such as water, liquid nitrogen or organic solvents. In hybrid milling, no other media is used in the initial grinding process. In salt milling, sodium chloride is preferably used in the grinding process but other salts or organic solids may be used. Preferably, for each part of talc, about 1 to 16 parts of salt are used as a media in the salt milling process, and more preferably, 4 to about 6 parts of salt are used. The first stage milling is preferably done in air for a period of time necessary to provide a powder with an SSA of about 40 m$^2$/g to about 130 m$^2$/g. This is usually accomplished in about 1 to 12 hours depending upon the SSA of the starting material and the milling conditions such as the energy input (KW/hour per unit material). In the case of salt milling the powder may exhibit an SSA of about 250 m$^2$/g after eight hours grinding.

In the second step of hybrid milling, soaking or salt milling, the talc material is mixed with water to form an aqueous talc slurry. Any mixing method may be used. Water may be added to the mill and mixed gently to provide a uniform slurry or dry talc may be transferred to a separate mixing apparatus and mixed under a low shear environment to provide a uniform talc slurry. The water may be untreated tap water or de-ionized water, distilled water, softened water, or the like, but de-ionized water is preferred. The water may be at any temperature between freezing and boiling and water between about 10° C. and about 30° C. is preferred. The water may be slightly acidic or slightly basic with no detriment to the product or process. Preferred is water with a pH between about 3 and about 11 and more preferred is a pH of about 4 to about 10, and most preferred is a pH about 5 to about 10.

At this point in the processes the hybrid milling, soaking and salt milling processes diverge. In the hybrid milling process in the third step the aqueous talc slurry is wet milled for a period of time to provide an aqueous hydrophilic nano-talc slurry with an SSA between 70 m$^2$/g to about 500 m$^2$/g. The time and temperature of wet milling may vary depending upon the surface area of the talc desired. Preferably, the hydrophilic nano-talc has a SSA of about 120 m$^2$/g to about 400 m$^2$/g and most preferably the hydrophilic nano-talc has a SSA of about 200 m$^2$/g to about 400 m$^2$/g. This method of dry milling followed by wet milling with water is hereafter referred to as the hybrid milling method. The attributes of the hybrid milling method, compared with conventional dry milling or wet milling process are revealed in considering the data displayed in FIG. 1 thru FIG. 4.

FIG. 1 plots the surface area of a talc as a function of milling time for a one step process of dry milling or wet milling that acts as a control. Under dry milling conditions the SSA of talc rises rapidly to a plateau of about 125 m$^2$/g after 6 h. Under wet milling with water the SSA of talc rises gradually and reaches about 125 m$^2$/g after 8 h.

Figure 2:
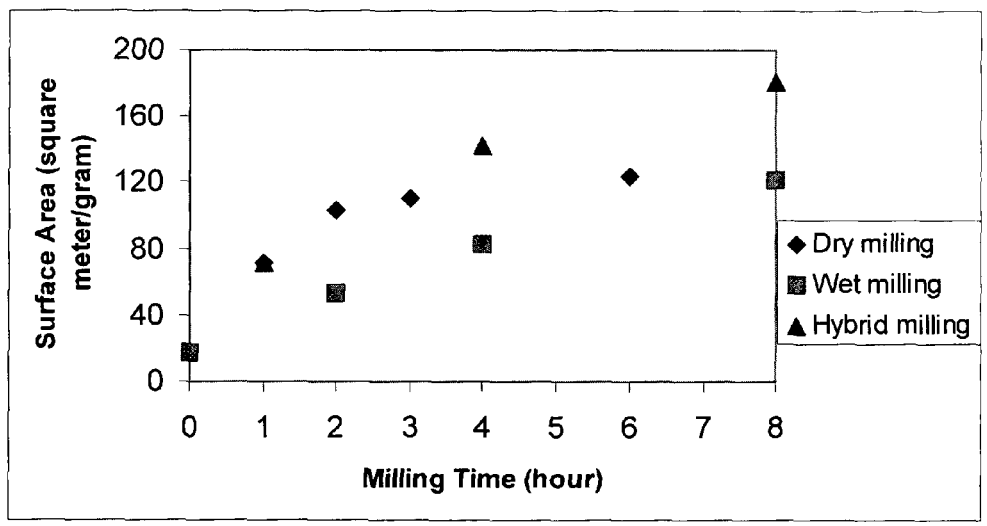
FIG. 2 compares the conventional dry and wet milling processes with the novel hybrid process of the invention wherein the talc is first dry milled for 1 hour.

FIG. 2 compares the conventional dry and wet milling process with a hybrid process wherein the talc is dry milled for 1 hour followed by wet milling for 3 and 7 h, respectively. The talc surface reaches 141.5 m$^2$/g and 180.5 m$^2$/g after 3 and 7 h wet milling, respectively.

Figure 3:
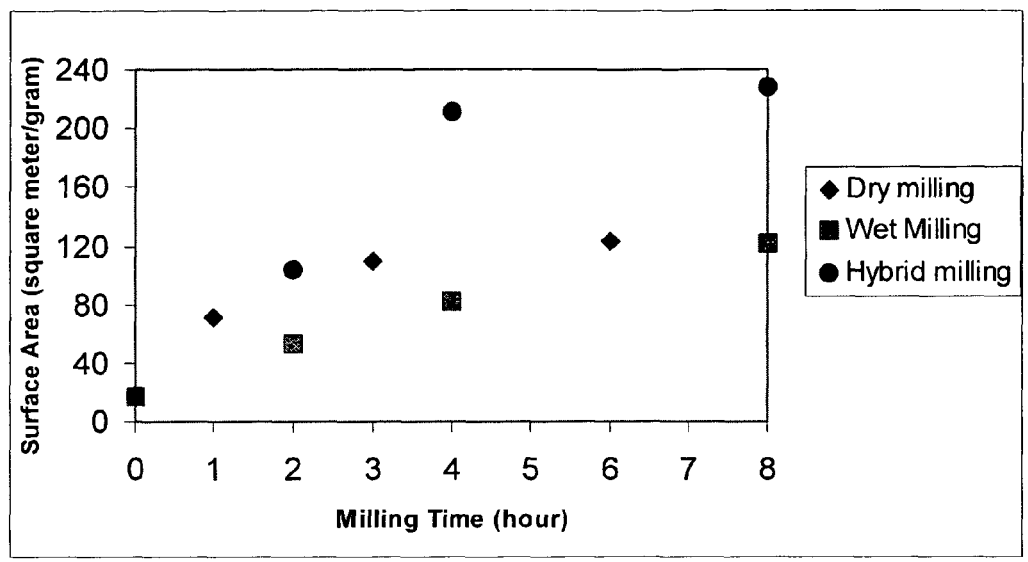
FIG. 3 compares the conventional dry and wet milling processes with a hybrid process of the invention wherein the talc is first dry milled for 2 hours.

FIG. 3 compares the conventional dry and wet milling process with a hybrid process wherein the talc is dry milled for 2 hours followed by wet milling for 2 and 6 h, respectively. The talc surface reaches 210.6 m$^2$/g and 228.1 m$^2$/g after 2 and 6 h wet milling, respectively.

Figure 4:
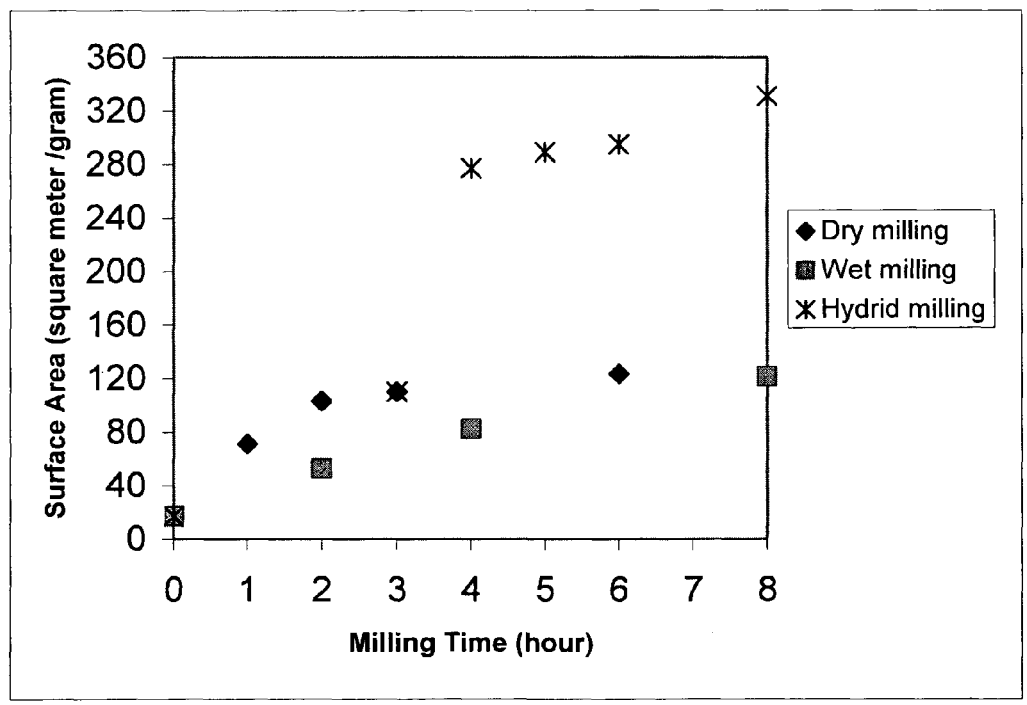
FIG. 4 compares the conventional dry and wet milling processes with a hybrid process of the invention wherein the talc is first dry milled for 3 hours.

FIG. 4 compares the conventional dry and wet milling process with a hybrid process wherein the talc is dry milled for 3 hours followed by wet milling for 1, 2, 3 and 5 h, respectively. The talc surface reaches 277.1 m$^2$/g and 331 m$^2$/g after 1 and 5 h wet milling, respectively. From these comparisons it is clear that the hybrid milling leads to significant increases in SSA of the talc slurry.

Figure 5:
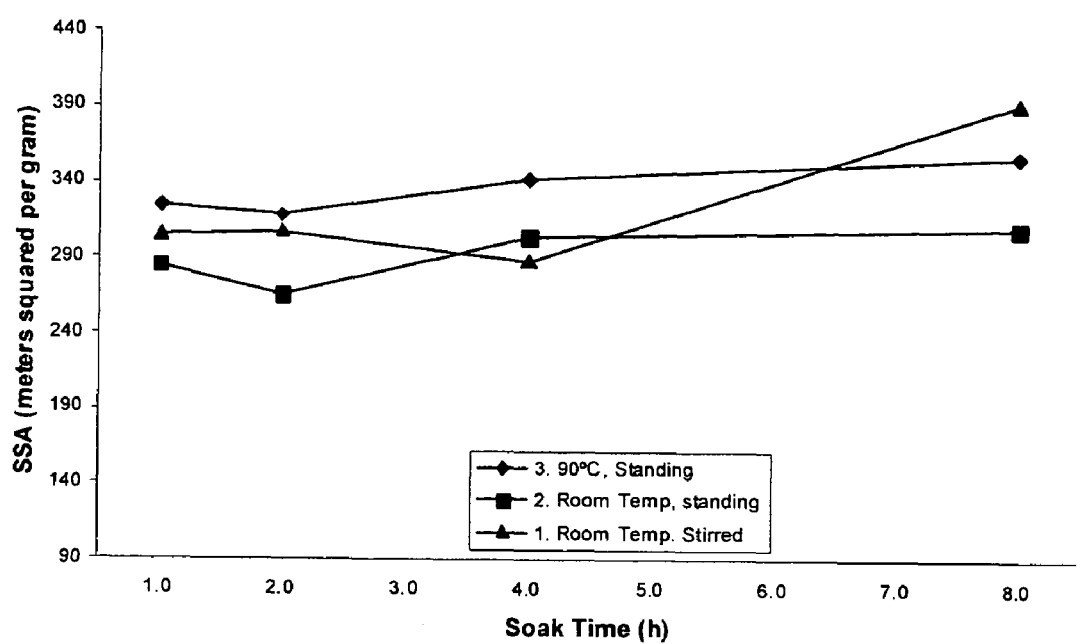
FIG. 5 illustrates the surface area of talc provided by the soaking method wherein the talc is first dry milled for 2.5 hours.

In the soaking process, in the third step the aqueous talc slurry is allowed to soak for a period of time to provide an aqueous nano-talc slurry with an SSA between 70 m$^2$/g to about 500 m$^2$/g. The time and temperature of soaking may vary depending upon the surface area of the talc desired. Preferably soaking is done with some form of agitation such as stirring. This method of dry milling followed by soaking with water is hereafter referred to as the soaking method. The attributes of the soaking method are revealed in considering the data displayed in FIG. 5 wherein the talc is first dry milled for 2.5 hours.

Figure 6:
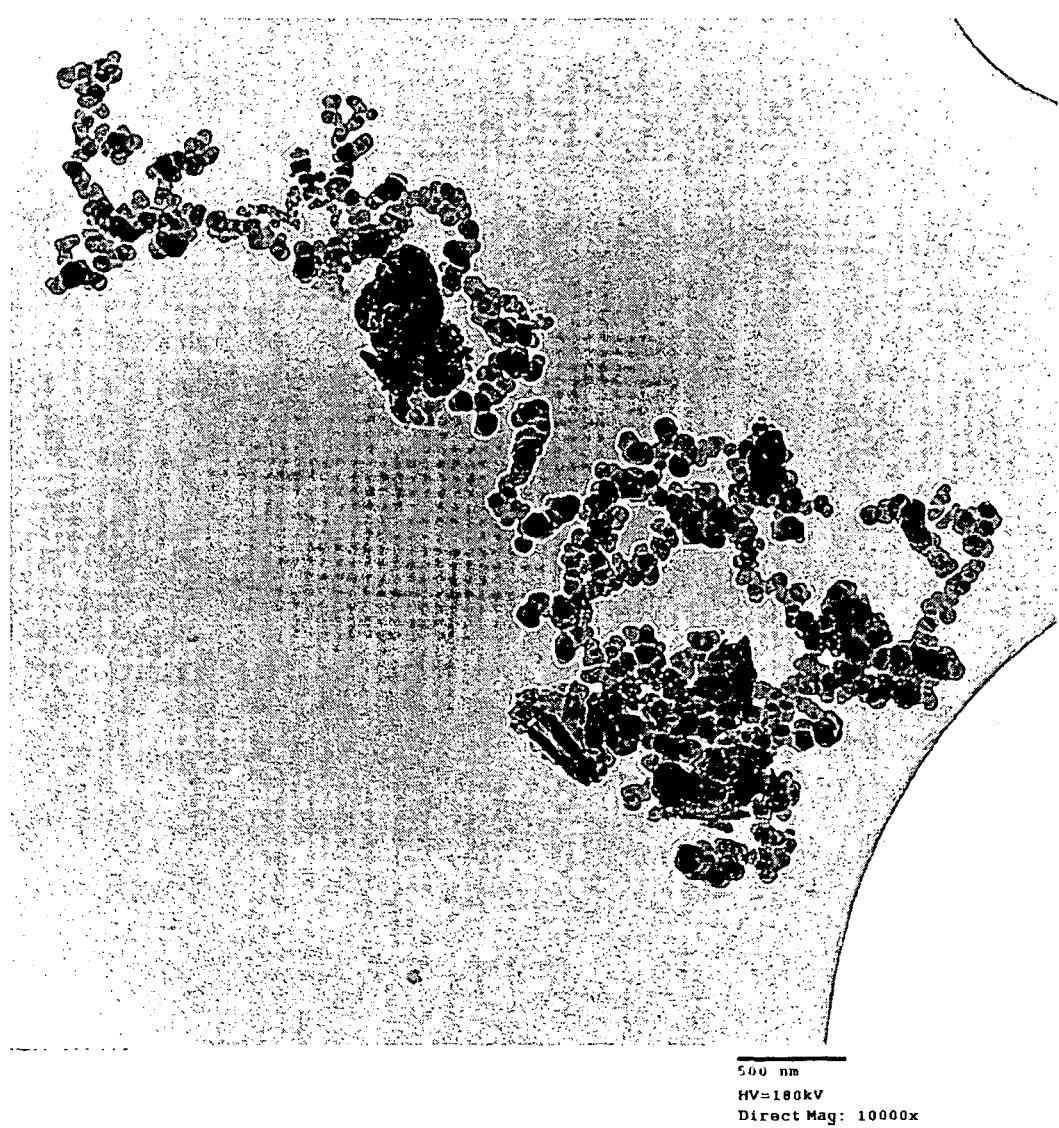
FIG. 6 shows a TEM image of the hybrid milled talc powder at 10,000× magnification.

Transmission electron microscope (TEM) images of the powder provided from hybrid milling are shown in FIG. 6. FIG. 6 is an image of the hybrid-milled powder at 10,000× magnification showing the 80 to about 100 nm particles that make up the vast majority of the particles. Further images (not shown) indicate that a few 1 μm particles are present and are agglomerates of smaller particles.

Figure 7:
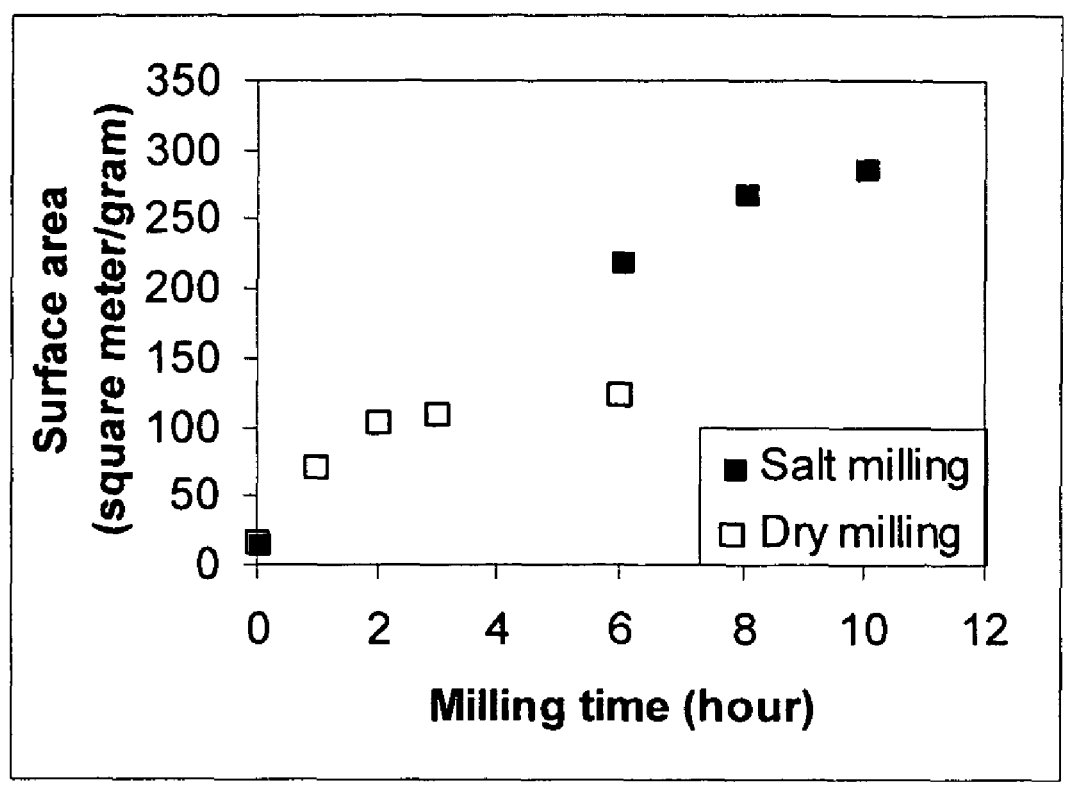
FIG. 7 illustrates the surface area of talc provided by the salt milling method wherein the talc is milled 6 to 12 hours.

In the salt milling process, after mixing with water the resulting talc slurry may be dewatered by a mechanical method. Useful dewatering methods for this step include membrane filtration and centrifugal decantation. The dewatering allows removal of salt. The talc slurry is further washed and dewatered with water to provide a substantially salt-free talc slurry. The talc slurry derived from salt milling usually is about 5 wt % to about 40 wt % talc. Preferred talc slurry has about 10 to about 35 wt % talc. The attributes of the salt milling method are illustrated in FIG. 7.

There is significant change in the attributes of talc upon treatment with the hybrid milling, soaking method and salt milling method. Several of the properties of the nano-talc are summarized in Table 1. The aqueous talc slurry provided by the hybrid milling process does not settle to give a supernatant liquid, but rather remains a mud-like suspension for months. Gentle stirring results in shear thinning and breaks the suspension into an easily flowable liquid. Talc suspensions derived from the dry milling process, in comparison, settle into a supernatant water layer and a heavier talc fraction within a few minutes. Talc slurry from the salt milling process settles within about 3 days. Nano-talc slurry derived from the soaking process settles within 1 hour.

TABLE 1

Summary of Talc Properties for Various Milling Methods

| | Hydrophilic properties | Long term aqueous suspension | Isoelectric point | Wt % water absorption (12 h) |
|---|---|---|---|---|
| Hybrid milling | +++ | +++ | 2.5-3.2 | 8.0 |
| Soaking | ++ | + | 2.8-3.2 | 6.2 |
| Salt milling | +++ | ++ | 2.5-3.0 | 10 |

+++ indicates a strong propensity for the material to exhibit the property.
+ indicates that there is a definite but marginal propensity for the property.

The hybrid milling process, soaking process and salt milling method provide a hydrophilic talc powder. As described earlier, talc is usually considered a hydrophobic mineral that disperses readily in organic solvents or polymers. However, the talc powders derived from hybrid milling, soaking and salt milling disperse only marginally in organic solvents and very readily in water. Conventional dry milling of talc provides a material with the hydrophobic properties of conventional talc.

Figure 8:
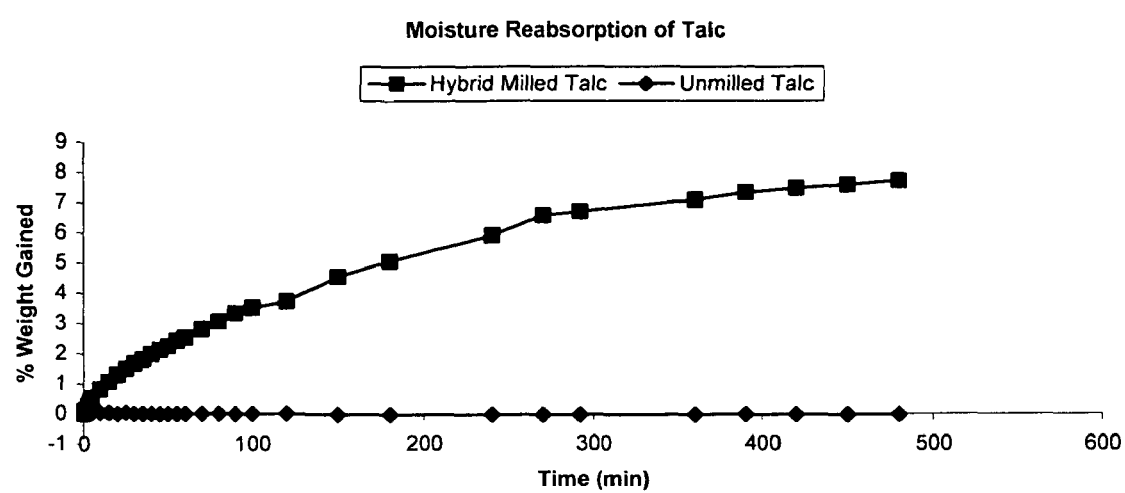
FIG. 8 compares the moisture uptake of conventional talc and the hydrophilic talc used in the invention.

Talc usually has very little moisture associated with it. Dry milling of talc provides a product that has about 0.5 wt % water. The hydrophilic talc derived from the hybrid milling, soaking or salt milling method absorbs up to about 5 wt % to about 15 wt % water over a period of twelve hours standing in air. FIG. 8 compares the moisture uptake of conventional talc and the hydrophilic talc provided by the hybrid milling process.

The hydrophilic talc provided by hybrid milling, soaking or salt milling is further characterized by an isoelectric point of 2.5 to about 3.5. The isoelectric point of a particulate material is defined as the pH of the carrier medium at which the zeta potential of the particles is measured to be zero. For measurement of zeta potential, an AC field is applied across an aqueous suspension of the particles, and wavelength change of a laser light beam impinging the aqueous suspension is measured. The solution is then titrated by the addition of base (usually sodium hydroxide solution) or acid (usually hydrochloric acid) to a pre-chosen pH, where the zeta potential is measured. The solution is then titrated in the direction of a target pH, and a zeta potential measured at chosen pH intervals as the titration approaches the second target. The pH where the zeta potential crosses zero, either by direct determination, or by interpolation of successive zeta potential measurements, is considered to be the isoelectric point.

At pH above the isoelectric point the particles are negatively charged. At a pH below the isoelectric point the particles are positively charged. Thus, in unbuffered water the nano-talc slurries derived from hybrid milling, salt milling or the soaking process comprise negatively charged particles. Using the characteristic negative charge of the nano-talc particles, the inventors have found that the nano-talc surface can be hydrophobically modified by addition of amphophilic cationic materials.

The nano-talc slurry used in the invention has an isoelectric point preferably about 2.5 to about 3.5 and more preferably about 2.5 to about 3.2. The dry powder derived from the nano-talc slurry preferably has a specific surface area of about 70 to about 500 $m^2/g$ and more preferably about 200 to about 400 $m^2/g$. The nano-talc slurry derived from hybrid milling and salt milling are preferred for the invention, and nano-talc from hydrid milling is most preferred.

The amphophilic cationic materials useful in the invention are selected from alkyl ammonium salts, alkyl pyridinium salts and alkyl phosponium salts that have at least one alkyl group selected from the group: $C_{12}$-$C_{22}$ straight-chain or branched-chain alkyl group, interrupted or uninterrupted by one or two oxygen atoms. The negative counterion can include those selected from the group: chloride, bromide, fluoride, iodide, tosylate, mesylate, tetraflouroborate, acetate, hydrosulfate, sulfate and hydroxide. Chloride and bromide are preferred counter-ion for the hydrophobic cation.

Examples of alkylpyridinium salts that are useful in the invention include cetylpyridinium chloride and bromide, laurylpyridinium chloride and bromide, and octadecylpyridinium chloride and bromide. Preferred alkylpyridinium salts are cetylpyridinium chloride and bromide, and octadecylpyridinium chloride and bromide.

Examples of alkylphosphonium salts useful in the invention include dodecyltriphenylphosphonium chloride and bromide, cetyltriphenylphosphonium chloride and bromide, and octadecyltriphenylphosphonium chloride and bromide. Preferred alkylphosphonium salts are octadecyltriphenylphosphonium chloride and bromide.

Preferably alkylammonium salts used in the invention are of the structure:

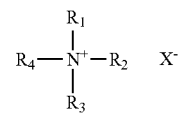

wherein $R_1$, $R_2$, $R_3$ and $R_4$ are, independently, selected from the group: hydrogen, $C_{12}$-$C_{22}$ straight-chain or branched-chain alkyl group interrupted or uninterrupted by one or two oxygen atoms, benzyl, 2-phenylethyl, 3-phenylpropyl, allyl, 3-butenyl, 4-pentenyl, and 5-hexenyl group; wherein at least one of $R_1$, $R_2$, $R_3$ and $R_4$ is selected from the group: $C_{12}$-$C_{22}$ straight-chain or branched-chain alkyl group interrupted or uninterrupted by one or two oxygen atoms; and $X^-$ is selected from the group chloride, bromide, fluoride, iodide, tosylate, mesylate, tetraflouroborate, acetate, and hydroxide. More preferred are alkyl ammonium salts wherein at least one of $R_1$, $R_2$, $R_3$ and $R_4$ is selected from the group: $C_{16}$-$C_{22}$ straight-chain or branched-chain alkyl group interrupted or uninterrupted by one or two oxygen atoms and $X^-$ is chloride or bromide.

Preferred ammonium salts include the hydrochlorides and hydrobromides derived from hydrophobic amines including dodecylamine, e.g. ARMEEN® 12D, hexadecylamine, e.g. ARMEEN® 16D, octadecylamine, e.g. ARMEEN® 18D, 3-(hexadecyloxy)propylamine, 3-(octadecyloxy)propylamine, e.g., PA-22/20 from Tomah Products, Inc., dioctadecylamine, e.g. ARMEEN® 218, trihexadecylamine, e.g. ARMEEN® 316 hexadecyldimethylamine, e.g. ARMEEN® DM16D, octadecyldimethylamine, e.g. ARMEEN® DM18D, hydrogenated tallowalkyldimethylamines, e.g. ARMEEN® DMHTD, tallowalkyldimethylamines, e.g. ARMEEN® DMTD, hydrogenated tallowalkylamines, e.g. ARMEEN® HT, di(hydrogenated tallowalkyl)methylamines, e.g. ARMEEN® M2HT, and tallowalkylamine, e.g. ARMEEN® T. The most preferred ammonium salts are the hydrochlorides derived from octadecylamine, hydrogenated tallowalkylamines and tallowakylamines. The ARMEEN® brand products referred to herein are trade names of AKZO NOBEL INC.

Other preferred ammonium salts useful in the invention are quaternary ammonium chlorides and bromides including cetyltrimethylammonium chloride, and bromide, e.g.

ARQUAD® 16-29, cetyldimethylethylammonium bromide, cetyltriallylammonium chloride and bromide, octadecyltriallylammonium chloride and bromide, cetyltribenzylammonium chloride and bromide, octadecyltrimethylammonium chloride, e.g. ARQUAD® 18-50, benzyldimethyloctadecylammonium chloride and bromide, benzyldimethylhexadecylammonium chloride and bromide, benzyldimethyl(hydrogenated tallowalkyl)ammonium chloride, e.g. ARQUAD® DMHTB-75, benzylmethyldi(hydrogenated tallowalkyl)ammonium chloride, e.g. ARQUAD® M2HTB, and tallowalkyltrimethylammonium chloride and bromide, e.g. T-ARQUAD® 50. The ARQUAD® brand products referred to herein are trade names of AKZO NOBEL INC.

In one embodiment the invention is a method of providing a hydrophobic nano-talc composition comprising: combining (a) an aqueous solution comprising about 0.5 to 10 wt % of an alkylammonium salt, alkylpyridinium salt or alkylphosphonium salt wherein the alkyl group is selected from the group $C_{12}$-$C_{22}$ straight-chain or branched-chain alkyl group interrupted or uninterrupted by one or two oxygen atoms; with (b) an aqueous nano-talc slurry comprising a plurality of nano-talc particles having an specific surface area of about 70 to 500 m$^2$/g, a number average particle size of 50 to about 200 nm and an isoelectric point of about 2.5 to about 3.5; with mixing at a reaction temperature sufficient to maintain the alkylammonium salt, alkylpyridinium salt or alkylphosphonium salt in solution, to provide a hydrophobic nano-talc precipitate, washing sufficiently the hydrophobic nano-talc precipitate with wash water, to provide a wash water effluent with a measured conductivity below about 400 μs/cm, followed by, optionally, dewatering the hydrophobic nano-talc precipitate to provide a hydrophobic nano-talc cake, and drying the hydrophobic nano-talc precipitate or hydrophobic nano-talc cake to provide the hydrophobic nano-talc composition. Alternatively the hydrophobic nano-talc precipitate may be dried directly by any convenient drying, for instance, spray drying at elevated temperature, for instance 90 to about 180° C.

The amount of alkyl ammonium salt, pyridinium salt or phosponium salt required to obtain full coverage of the nano-talc particles can be calculated using the specific surface area (SSA) of the nano-talc and the specific area coverage (SAC) of the respective hydrophobic salts. The SAC is usually specified in vendor catalogues that offer surface active agents. Also, the reference "Surfactant and Interfacial Phenomena", M. J. Rosen, John Wiley & Son, New York 1978, p 63, list many SAC values for surface active agents. The following equation may be used to determine the amount of hydrophobic salt for a nominal monolayer surface coverage:

$$\text{Wt \% surface agent} = \frac{SSA \text{ m}^2/\text{g}}{SAC \text{ m}^2/\text{g}} \times 100\%$$

When a primary alkyl ammonium salt is to be used, preferably a hydrochloride salt is first prepared by addition of about one equivalent of hydrochloric acid to an equivalent of the primary alkyl amine dispersed in water. The aqueous amine dispersion can be heated to 30° C. to about 90° C. to improve the solubility of the amine salt. Other acid salts such as bromide, acetate, sulfate and hydrosulfate are available by similar means. Quaternary ammonium salts, pyridinium salts and phosphonium salts can be prepared by known procedures and dissolved or dispersed in aqueous solution. Preferably the ammonium salt aqueous solution comprises about 1 to about 5 wt % salt.

The addition of the aqueous nano-talc slurry to the aqueous ammonium salt is usually preformed at elevated temperature, preferably about 50° C. to about 90° C., and most preferably about 80° C. The salt solution is stirred vigorously during the addition of the nano-talc slurry. After addition is complete, stirring is continued for a period of time to ensure adequate distribution of the salt on the nano-talc. When the stirring is completed, the hydrophobic nano-talc precipitates immediately to give a hydrophobic nano-talc sediment and an aqueous supernatant that can be easily removed by decantation. The hydrophobic nano-talc can be washed one or more times with water to remove inorganic salts. Usually no more than three washes with heated water are sufficient to bring the conductivity of the deionized wash water to conductivity below 400 μs/cm.

In the method of the invention, optionally, the hydrophobic nano-talc precipitate can be dewatered by any suitable method. For instance, the precipitate can be filtered using a membrane filter or other filtering method. Often, the filter cake is pressed to remove further water.

In a further process step of the invention the aqueous hydrophobic nano-talc precipitate or the filter cake derived from dewatering can be dried to give a dry flowable powder consisting essentially of about 98 to 99.5 wt % hydrophobic nano-talc. Any conventional drying method or series of methods may be used to provide the dry talc powder. For instance, a 100% thermal drying may be used or preferably a combination of mechanical dewatering followed by thermal dewatering may be used. Dewatering methods useful in serial drying include decantation, membrane filtration and centrifugal decantation. Drying methods that may be applied include flash drying, tray drying, spray drying, freeze drying, and fluidized bed drying. The drying may be carried out under ambient conditions or under vacuum. However, preferably the hydrophobic talc precipitate, after mechanical dewatering, is dried in a two-step process wherein the first step rapidly removes the bulk of the moisture and the second step, over a longer residence time, removes the remaining moisture. For instance, a flash mill dryer, e.g. a Hosokowa Long Gap Mill, may be used to reduce the moisture content from about 50 wt % to about 5 wt %. The material is then transferred to a long residence time dryer that may reduce the moisture content of the hydrophobic nano-talc powder to about 2.0 to about 0.5 wt %.

In another embodiment the invention is a hydrophobic nano-talc composition comprising the aqueous reaction product derived from reaction of a plurality of nano-talc particles having a specific surface area of about 70 to 500 m$^2$/g, a number average particle size of 50 to about 200 nm and an isoelectric point of about 2.5 to about 3.2; and an alkylammonium salt, alkylpyridinium salt, or alkylphosphonium salt wherein the alkyl group is selected from the group $C_{12}$-$C_{22}$ straight-chain or branched-chain alkyl group interrupted or uninterrupted by one or two oxygen atoms. The composition of the invention is further characterized by having a carbon content in the moisture free state of about 5 wt % to about 25 wt % as determined with combustion analysis. Preferably, the carbon content is about 10 wt % to about 20 wt %. The particle size of the composition of the invention is similar to that of the nano-talc starting material. The product of the invention has a number average particle size of 50 to about 200 nm. The SSA of the hydrophobic nano-talc is about 40 to about 90 m$^2$/g demonstrating that the general tendency for the SSA value to significantly decrease after surface modification using amphophilic cations.

Although the inventions disclosed herein are not limited to any mechanism or theory of action, the following explanation is offered as a working model by which the properties of the hydrophobic nano-talc composition of the invention may be understood. Consistent with the proceeding discussion hydrophilic nano-talc used in the invention has a platy surface and is negatively charged. The electrical repulsion causes the platelets to separate from each other. Thus, almost all the surface areas are available for nitrogen molecule absorption. However, with the hydrophobic modified nano-talc of the invention Wan de Val forces and steric hindrances among the long carbon hydrogen chains tend to inhibit many surfaces toward nitrogen absorption. Nitrogen molecules may not be able to reach those platy surfaces, resulting in a lower value in SSA. However, those hydrophobic surface areas upon mixing with organic molecules, e.g., polymer chains, may act to allow easy insertion into the interlayers.

The hydrophobic nano-talc of the invention is compatible with many hydrophobic non-polar polymers including thermoplastic polymers including polyolefins, e.g. polypropylene and polyethylene, polyphenylene ethers, polycarbonate, polyimides, polyetherimides, polysulfones, polyarylene sulfides, polyetherketones, polyamides, polyesters, acrylics, polystyrene and copolymers and/or blends and thermosetting polymers such as polyurethane, polyurea, polysilicones, epoxy, phenyl formaldehyde resins. Uses for such composite materials include molded composites, sheet goods, laminates, coatings, sealing and gasketing compounds. The hydrophobic nano-talc also may be used as a primary pigment or pigment extender in a wide variety of toners and resins, including toners for ink-jet printing, and solvent based paints and laquers.

Nano-Talc Preparation 1

The following illustrates the preparation of a nano-talc slurry by the hydrid milling process and is characterized by an increase in surface area when ground talc is further treated with water in a wet milling process:

UltraTalc™ 609 talc powder (800 g, Specialty Minerals Inc., initial SSA about 17 $m^2/g$, 0.9 um average particle size) and 4.8 mm yttria-stabilized zirconia balls (16 Kg, d=5.75 g/$cm^3$) were loaded into an Union Process 1-S Attritor with stainless steel tank and shaft and mechanically milled (energy input about 0.8 KW/h) with external water cooling for 3 hours at 350 rpm to provide a powder with an SSA of 113.8 $m^2/g$). Untreated tap water (2.5 L) was added to the tank and milling continued for another 3 hours. The slurry was discharged and dried in an oven (100° C., 12 h, in air). The resulting powder has an SSA of 295.1 $m^2/g$. The particle size is an average platelet diameter of about 80 to 100 nm as determined by TEM on a sample dispersed in methanol and deposited on a carbon grid. A 20 cm deep sample of the talc slurry separated into about 1-2 mm water and 19.8-19.9 cm talc suspension over 3 months.

Nano-Talc Preparation 2

The following illustrates the aqueous soaking method for making high surface area nano-talc:

UltraTalc™ 609 talc powder was dry milled for 2.5 h as described in nano-talc preparation 1. The SSA of the powder was 95 $m^2/g$. The milled talc was then mixed with de-ionized water (20 parts by weight) for varying amounts of time, under the following soak conditions: (1) room temperature, stirred at 1000 RPM; (2) room temperature, standing water; and (3) 90° C., standing water. Samples were drawn at 1, 2, 4, and 8 hours, and dried in an oven at 200° C. for SSA measurements. Table 1 lists the SSA results that are plotted in FIG. 5. It is evident from these that the addition of heat or mechanical energy to the soaking process increases the surface area relative to the ambient, unstirred process.

| Soak Conditions | Soak Time(hr) | Surface Area |
|---|---|---|
| 1. room temp, stirred | 1 | 305.50 |
| | 2 | 307.11 |
| | 4 | 288.13 |
| | 8 | 392.39 |
| 2. room temp, standing | 1 | 284.87 |
| | 2 | 264.76 |
| | 4 | 303.91 |
| | 8 | 309.60 |
| 3. 90 C., standing | 1 | 324.60 |
| | 2 | 317.78 |
| | 4 | 342.58 |
| | 8 | 357.41 |

Nano-Talc Preparation 3

The following illustrates the preparation of nano-talc by the salt milling method. UltraTalc® 609 powder (4 kg, initial SSA about 17 $m^2/g$), sodium chloride (20 kg), and 5 mm yttria stabilized zirconia balls (277.5 kg) were loaded into a 30 S Szegvari Attritor (Union Process Inc.), and mechanically milled 10 hours at 135 rpm. Samples were taken at 6 h and 8 h for SSA measurement. The salt/talc mixture was transferred to a membrane filter press and washed with water until the conductivity measured less than 1 ms/cm to provide a nano-talc cake of about 50 wt % talc. Dried samples at 6, 8 and 10 hours had SSA values of about 220, 270 and 288 $m^2/g$, respectively.

Nano-Talc Characterization—Moisture Uptake

The following illustrates the hydrophilic nature of high surface area nano-talc used in the invention in comparison with commercial grade talc.

A sample of the talc slurry provided from Nano-talc Preparation 1 was dried at 200° C. until no further weight loss was exhibited in a Mettler-Toledo HR83P moisture balance. The resultant material was then ground in a mortar and pestle, and re-dried in the same manner as before. The powder was allowed to cool in a vacuum desiccator, then placed on a tared balance and monitored for moisture weight gain at a relative humidity of about 49%. This procedure was repeated with unmilled UltraTalc® 609 powder. The weight gain of hybrid-milled and unmilled samples is plotted in FIG. 8 and illustrates the significantly greater moisture absorption of the hybrid-milled product used in the invention.

Nano-Talc Characterization—Isoelectric Point

The following description illustrates the characterization of nano-talc by isoelectric point determination.

Samples of nano-talc derived from the soaking method where used to determine the isoelectric point. A sample of nano-talc suspended in de-ionized water was prepared in a sample cup and diluted to give a Malvern Zetasizer CPS correlator count of 500 to 2000. The suspension was visibly clear, and free of dust particles. The suspension was placed in the auto-titrator unit of the Malvern Zetasizer 3000 HS. The experiment began by a machine check of detector counts. The suspension was titrated to pH of 2, by measured addition of 1.0 M HCl solution. Zeta potential of the talc at this pH was then determined by standard Dynamic Light Scattering (DLS) techniques. The suspension was then titrated stepwise, with a step of about 0.5 pH units, toward a pH of 7. At each step, the Zeta potential of the nano-talc was measured by DLS, and plotted vs. pH of the suspension. The pH at which the Zeta potential interpolated to be 0 was interpreted as the isoelectric point. Four nano-talc samples were measured in this manner. Each sample was prepared by soaking dry-milled talc (3 hours, SSA 95 m$^2$/g) in DI water at 70° C. at varying concentrations for varying times. Results are tabulated below in Table 3.

TABLE 3

Isoelectric point of nano-talc prepared by soaking method.

| Soak Conc. % talc | Soak Time (h) | Isoelectric point |
|---|---|---|
| 20 | 1 | 2.96 |
| 20 | 2 | 3.21 |
| 30 | 1 | 2.81 |
| 30 | 2 | 2.84 |

EXAMPLE 1

This example illustrates the formation of hydrophobic nano-talc of the invention using nano-talc derived from hydrid milling.

A stirred mixture of ARMEEM® 18D (3.24 kg, Akzo Noble, 95% purity, SAC=385 m$^2$/mmol) and deionized (DI) water (125 kg) was heated to 80° C. Hydrochloride acid (1 M, 11.44 L) was added and stirring continued for 1 h to provide a clear solution. A hybrid milled nano-talc aqueous slurry (SSA=277 m$^2$/g, about 20% solid content, 16 kg talc, Preparation 1), preheated to 80° C. was slowly added and the mixture stirred at 80° C. for 0.5 h. The precipitate was separated by decantation of the water and washed one time with DI water (80 Kg) preheated to 80° C. The conductivity was measured to be below 400 µs/cm. The resulting material was dried using a 1B Atritor Dryer (Atritor Ltd.) to provide the product as an off white powder with the moisture content of 1.5 wt %. The carbon content was 12.5 wt % (by carbon combustion analysis measured with a Leco CS200), which corresponded to 16% organic content and was equivalent to 100% surface coverage of protonated ARMEEN® 18D. The powder was demonstrated non-wetting in water (floating on top of the water). The particle size was similar to the nano-talc starting material. The SSA of the hydrophobic nano-talc was 40 m$^2$/g.

EXAMPLE 2

This example illustrates the surface treatment of nano-talc derived from salt-milling.

A stirred mixture of DI water (1500 g) and ARMEEN® 18D (35 g, Akzo Nobel, 95% purity) was heated to 80° C. Hydrochloride acid (124 ml, 1 M) was added and stirring continued for 0.5 h to provide a clear solution. Nano-talc aqueous slurry (13 wt % in talc, 150 g talc) produced by dispersing salt-milled nano-talc cake (Preparation 3) was heated to 80° C. and slowly added and the mixture stirred at 80° C. for 0.5 h. The pH was measured to be about 7. The precipitate was separated and washed three times using DI water (750 ml) warmed to 80° C. with until the conductivity was below 400 µs/cm. The product was dried in a vacuum oven at 80° C. for 8 hours. The final product was off white in color with the moisture content of about 2 wt %. The carbon content was 15 wt % which corresponded to 18.7% organic content and was equivalent to 100% surface coverage of protonated ARMEEN® 18D. The powder was demonstrated non-wetting in water (floating on top of the water). The particle size was similar to the nano-talc starting material.

EXAMPLE 3

This example illustrates the surface treatment of nano-talc derived from the soaking method.

To a stirred mixture of ARMEEN® 18D (3.52 kg) and DI water (140 kg), heated to 80° C. was added hydrochloride acid (1 M, 12.43 L) and stirring continued for 1 h to provide a clear solution. A soaking milled nano-talc aqueous slurry (SSA=292 m$^2$/g, about 20% solid content, 16 kg talc, Preparation 2), preheated to 80° C. was slowly added into the reactor and the mixture was stirred at 80° C. for 0.5 h. The precipitate was separated by decantation of water and washed 3 times using DI water (80 Kg) preheated to 80° C. The conductivity was measured to be below 400 µs/cm. The material was further dried using 1B Atritor Dryer (Atritor Ltd.) to provide the product as an off white powder with the moisture content of 2.0 wt %. The carbon content was 12 wt %, which corresponded to 15% organic content and was equivalent to 90% surface coverage of protonated ARMEEN® 18D. The powder was demonstrated non-wetting to water (floating on top of the water). The particle size, as determined by TEM, was similar to untreated nano-talc.

EXAMPLE 4

This example illustrates that the use of salt milled talc in the invention without prior removal of the salt.

A stirred mixture of salt/nano-talc mixture (90 g, with 15 g of nano-talc, produced by salt-milling process of Preparation 3) and DI water (180 ml) was heated to 80° C. to provide a salt/nano-talc slurry. A mixture of DI water (140 ml) and ARNEEN® 18D (3.5 g) was heated to 80° C. Hydrochloride acid (12.4 ml, 1 M) was added and the mixture stirred for 0.5 h to produce a clear solution. The salt nano/talc slurry was added slowly into the ammonium salt solution and the mixture stirred at 80° C. for 0.5 h. The pH was about 7. The precipitate was separated and washed 3 times with DI water (75 mL) warmed to 80° C. until the conductivity was below 400 µs/cm. The precipitate was dried in a vacuum oven at 80° C. for 8 h. The product was off white in color with the moisture content of about 2 wt %. The carbon content was 14.4% corresponding to an organic content of about 18%, which corresponded to 100% surface coverage of protonated ARMEEN® 18D. The powder was non-wetting to water (floating on top of the water). The particle size was similar to untreated nano-talc.

EXAMPLE 5

To a heated stirred mixture of DI water (200 ml) and PA-22/20 alkyloxypropylamine (5.0 g, Tomah Products, Inc.) was added hydrochloride acid (124 ml, 1 M)) at 80° C. and stirring continued for 0.33 h to provide a clear solution. Nano-talc aqueous slurry (154 g, 8.2% wt %, 12.5 g nano-talc, from Preparation 3) was slowly added and the mixture stirred at 80° C. for 0.5 h. The pH was 7. The precipitate was separated by decantation and washed 3 times with DI water (50 ml) heated to 80° C., until the conductivity was about 130 µs/cm. The material was dried in a vacuum oven at 80° C. for 8 h to provide a powder with an off white color and a moisture content of about 2%. The carbon content was 16% corresponding to an organic content of about 20%. The powder was non-wetting to water (floating on top of the water). The particle size was similar to untreated nano-talc and the SSA was 62 m²/g.

EXAMPLE 6

A mixture of DI water (200 ml) and cetyltrimethylammonium bromide (5.0 g) was stirred at 80° C. for 10 minutes to provide a clear solution. A nano-talc aqueous slurry (154 g, 8.2% solid content, 12.5 g talc, preparation 3) heated to 80° C. was slowly added to the clear solution and the mixture stirred at 80° C. for 0.5 h. The pH was about 7. The precipitate was separated by centrifugation and washed 3 times using DI water (50 mL) heated to 80° C., until the conductivity was about 130 μs/cm. The product was dried in a vacuum oven at 80° C. for 8 hours to give a powder, off white in color, with the moisture content of about 2%. The carbon content was 15.2% corresponding to an organic content of about 20%.

EXAMPLE 7

A mixture of DI water (2700 ml) and ARQUAD 2HT-75 (Akzo Nobel, 5.0 g, 75% activity) was heated to 80° C. with stirring for 10 minutes to provide a clear solution. A nano-talc aqueous slurry (1200 g, 12.6% solid content, 150 g talc) heated to 80° C. was slowly added to the clear solution and the mixture stirred at 80° C. for 0.5 h. The pH was about 7. The precipitate was separated by centrifugation and washed 3 times with DI water (600 mL) heated to 80° C., until the conductivity is about 400 μs/cm. The treated material was dried in a vacuum oven at 80° C. for 8 hours to provide a powder with an off-white color and a moisture content of about 1%. The carbon content was 21.2% corresponding to an organic content of about 31.2%. The particle size was similar to the nano-talc starting material.

It is understood that the above-described embodiments of the invention are illustrative only and modification thereof may occur to those skilled in the art. Accordingly, it is desired that this invention is not to be limited to the embodiments disclosed herein but is to be limited only as defined by the appended claims and their legal equivalents.

What is claimed is:

1. A hydrophobic nano-talc composition comprising the aqueous reaction product derived from reaction of a plurality of nano-talc particles having a specific surface area of about 70 to 500 m²/g, a number average particle size of 50 to about 200 nm and an isoelectric point of about 2.5 to about 3.5; and an alkylammonium salt, alkylpyridinium salt, or alkylphosphonium salt, wherein the alkyl group is selected from the group $C_{12}$-$C_{22}$ straight-chain or branched-chain alkyl group interrupted or uninterrupted by one or two oxygen atoms.

2. A hydrophobic nano-talc composition of claim 1 further characterized by having a carbon content in the moisture free state of about 5 wt % to about 25 wt %.

3. A hydrophobic nano-talc composition of claim 1 wherein the plurality of nano-talc particles have a specific surface area of about 200 to 400 m²/g and an isoelectric point of about 2.5 to about 3.2.

4. A hydrophobic nano-talc composition of claim 1 wherein the plurality of nano-talc particles is provided by hybrid milling.

5. A hydrophobic nano-talc composition of claim 1 wherein the plurality of nano-talc particles is provided by salt milling.

6. A hydrophobic nano-talc composition of claim 1 wherein the alkyl ammonium salt has the structure:

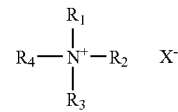

wherein $R_1$, $R_2$, $R_3$ and $R_4$ are, independently, selected from the group: hydrogen, $C_{12}$-$C_{22}$ straight-chain or branched-chain alkyl group, benzyl, 2-phenylethyl, 3-phenylpropyl, allyl, 3-butenyl, 4-pentenyl, and 5-hexenyl group; and wherein at least one of $R_1$, $R_2$, $R_3$ and $R_4$ is selected from the group: $C_{12}$-$C_{22}$ straight-chain or branched-chain alkyl group interrupted or uninterrupted by one or two oxygen atoms.

7. A hydrophobic nano-talc composition of claim 6 wherein $R_1$, $R_2$, and $R_3$ are hydrogen and $R_4$ is a $C_{16}$-$C_{22}$ straight-chain or branched-chain alkyl group.

8. A hydrophobic nano-talc composition of claim 7 wherein $R_4$ is a $C_{18}$ straight-chain or branched-chain alkyl group.

9. A hydrophobic nano-talc composition of claim 7 wherein $R_4$ is a mixture of $C_{18}$-$C_{20}$ straight-chain or branched-chain alkyl group.

10. A hydrophobic nano-talc composition of claim 6 wherein at least one of $R_1$, $R_2$, $R_3$ and $R_4$ is selected from the group: benzyl and allyl group.

11. A hydrophobic nano-talc composition of claim 6 wherein at least two of $R_1$, $R_2$, $R_3$ and $R_4$ are allyl groups.

12. A hydrophobic nano-talc of claim 1 that is in the form of a dry powder.

13. A method of providing a hydrophobic nano-talc composition comprising: combining (a) an aqueous solution comprising about 0.5 to 10 wt % of an alkylammonium salt, alkylpyridinium salt or alky phosphonium salt wherein the alkyl group is selected from the group $C_{12}$-$C_{22}$ straight-chain or branched-chain alkyl group interrupted or uninterrupted by one or two oxygen atoms; with (b) an aqueous nano-talc slurry comprising a plurality of nano-talc particles having a specific surface area of about 70 to 500 m²/g, a number average particle size of 50 to about 200 nm and an isoelectric point of about 2.5 to about 3.5; with mixing at a reaction temperature sufficient to maintain the alkylammonium salt, alkylpyridinium salt or alkyl phosphonium salt in solution, to provide a hydrophobic nano-talc precipitate, washing sufficiently the hydrophobic nano-talc precipitate with wash water, to provide a wash water effluent with a measured conductivity below about 400 μs/cm, followed by, optionally, dewatering the hydrophobic nano-talc precipitate to provide a hydrophobic nano-talc cake, and drying the hydrophobic nano-talc precipitate or hydrophobic nano-talc cake to provide the hydrophobic nano-talc composition.

14. A method of claim 13 wherein the aqueous nano-talc slurry is added to the aqueous solution comprising about 0.5 to 5 wt % of an alkylammonium salt, alkylpyridinium salt or alkylphosphonium salt.

15. A method of claim 13 wherein the reaction temperature is about 50 to about 90° C.

16. A method of claim 13 wherein the plurality of nano-talc particles have a specific surface area of about 200 to 400 m²/g and an isoelectric point of about 2.5 to about 3.2.

17. A method of claim 13 wherein the alkylammonium salt has the structure:

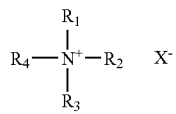

wherein $R_1$, $R_2$, $R_3$ and $R_4$ are, independently, selected from the group: hydrogen, $C_{12}$-$C_{22}$ straight-chain or branched-chain alkyl group, benzyl, 2-phenylethyl, 3-phenylpropyl, allyl, 3-butenyl, 4-pentenyl, and 5-hexenyl group; and wherein at least one of $R_1$, $R_2$, $R_3$ and $R_4$ is selected from the group: $C_{12}$-$C_{22}$ straight-chain or branched-chain alkyl group interrupted or uninterrupted by one or two oxygen atoms.

* * * * *